United States Patent Office 3,798,204
Patented Mar. 19, 1974

3,798,204
ASPARTYL-(O-ALKYL)-SERINE METHYL ESTER SWEETENERS
Nobuo Nakajima, Hyogo, Hisashi Aoki, Osaka, Masahiko Fujino, Hyogo, and Osamu Nishimura and Mitsuhiro Wakimasu, Osaka, Japan, assignors to Takeda Chemical Industries, Ltd., Osaka, Japan
No Drawing. Filed Aug. 20, 1971, Ser. No. 173,636
Claims priority, application Japan, Aug. 21, 1970, 45/73,597
Int. Cl. A23l 1/26; C07c 103/52
U.S. Cl. 260—112.5                                6 Claims

ABSTRACT OF THE DISCLOSURE

Dipeptide ester sweeteners are provided herein of the formula:

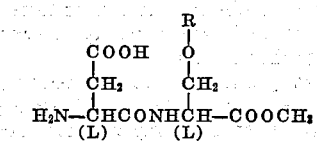

wherein R is tertiary butyl or tertiary amyl and its physiologically acceptable salt. The present invention also relates to methods of preparing the aforementioned compounds as well as sweetening compositions containing dipeptide esters.

---

The present invention relates to novel dipeptide ester compounds which are of value, for example, as sweeteners for foods as well as to compositions for use as sweeteners and to foods thus sweetened by the use of the peptide ester compounds. The invention also relates to methods for producing such sweeteners as well as to the method for sweetening foods.

It has now been found by the present inventors that dipeptide esters of the General Formula I:

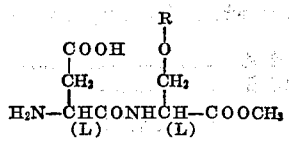

wherein R is tertiary butyl or tertiary amyl and their physiologically acceptable salts as well, all of these compounds being novel compounds, have excellent food-sweetening properties.

It has further been found that the dipeptide ester compounds are readily soluble in water and convenient for use as food sweeteners.

It is an object of the present invention to provide novel dipeptide ester compounds.

Another object of the present invention is to provide foods sweetened by the use of the peptide ester compounds.

A further object of the present invention is to provide sweetening compositions prepared from the dipeptide ester compounds.

A further object of the present invention is to provide an industrially advantageous method for the production of the novel dipeptide ester compounds.

A further object of the present invention is to provide a practical method for producing sweetened foods.

The novel dipeptide ester compounds of the present invention are produced in the following ways.

(1) A method, which comprises condensing a compound of the General Formula II:

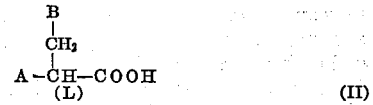

wherein A is a protected amino group and B is a protected carboxyl group, with a compound of General Formula III:

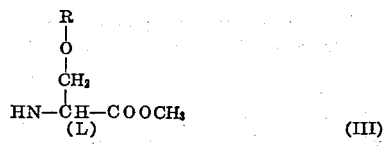

wherein R has the same meaning as defined above to obtain a dipeptide ester derivative of General Formula IV:

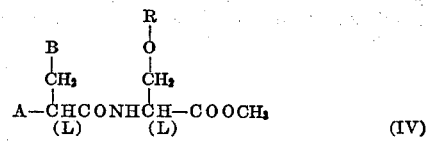

wherein A, B and R have the same meaning as defined above and subsequently removing the protective groups from the last-mentioned Compound IV.

(2) A method, which comprises etherizing a dipeptide ester derivative of General Formula V:

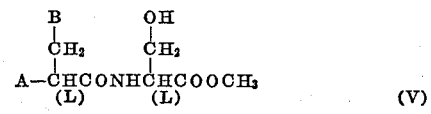

wherein A is a protected amino group and B is a protected carboxyl group to obtain the above mentioned dipeptide ester derivative of General Formula IV and subsequently removing the protective groups from the Compound IV.

(3) A method, which comprises reacting a compound of General Formula VI:

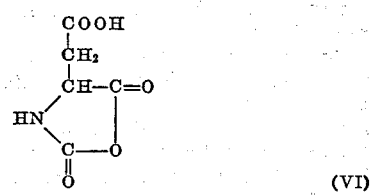

with the above mentioned compound of General Formula III:

Referring to General Formulas II, IV and V, the protected amino group A is a group which will ultimately be converted to an amino group upon removal of the protective group. There have been established a number of such protected amino groups in the field of peptide synthesis and such a group can be conveniently utilized in the processes of this invention. However, from the standpoints of economy and ease of processing, benzyloxycarbonylamino group is the most desirable.

As regards the protected carboxyl group B in General Formulas II, IV and V, a suitable group may likewise be selected from the class of a number of established groups. Among such groups the benzyloxycarbonyl group is a preferred example.

The condensation according to method (1) may also be carried out by the techniques established for the condensation of a compound having a carboxyl group and a compound having an amino group. Thus, the technique of reacting a compound of the General Formula II with a compound of the General Formula III in the presence of a dehydrating agent such as dicyclohexylcarbodiimide and the technique which comprises converting a compound of the General Formula II to the corresponding reactive derivative such as the pentachlorophenyl ester or acid chloride and, then, reacting the derivative with a compound of the General Formula III may be mentioned by way of example. While the reaction generally proceeds at room temperature, it may be carried out under cooling or heating in a range from about $-10°$ C. to about $40°$ C. Any solvent can be employed if it will not adversely affect the reaction. Thus, dimethylformamide, chloroform, benzene and the like may be utilized. The reaction usually completes within a period ranging from about 2 hours to about 24 hours.

With regard to the removal of protective groups according to method (1) or (2), a number of expedient techniques are known which are adapted to different types of protective group and, for the present purpose, such techniques can be utilized to advantage. Among such techniques is a hydrogenation reaction involving the use of palladium black as a catalyst. Generally, the reaction proceeds satisfactorily at room temperature, but it may be conducted under cooling or slightly heating at a temperature in a range from about $5°$ C. to about $60°$ C. Usually, the reaction is carried out in the presence of a suitable solvent, which may for instance be water, methanol, ethanol, dioxane, tetrahydrofuran, acetic acid, t-butyl alcohol or isopropyl alcohol. The reaction is usually completed within a period ranging from about one hour to about 6 hours.

As for the etherizing reaction of the method (2), any technique that is per se conventional may also be employed to incorporate a t-butyl group or t-amyl group into a compound of the General Formula V through etherization. For example, a compound of the General Formula V can be reacted with a corresponding olefinic compound (i.e. isobutene, 2-methyl-1-butene or 2-methyl-2-butene). When the Compound V is reacted with isobutene, the Compound IV in which R is t-butyl is produced. And when the Compound V is reacted with 2-methyl-1-butene or 2-methyl-2-butene, the Compound IV in which R is t-amyl is produced. The reaction is preferably carried out in the presence of an acid catalyst. Any of the acid catalysts which are known to be conveniently used for the reaction between an alcohol and an olefin are employable, but a mineral acid (e.g. sulfuric acid) is most advantageous.

An excess amount, e.g. about 20 to about 50 mols of isobutene, 2-methyl-1-butene or 2-methyl-2-butene is usually used per mol of the Compound V. The unreacted isobutene, 2-methyl-1-butene or 2-methyl-2-butene can be recovered and is again employable to the reaction. The reaction may be carried out in an open vessel or a sealed vessel. The reaction temperature is usually in a range from about $0°$ C. to about $40°$ C. The reaction is completed within a range from about 3 hours to about 2 days.

The method (3) comprises reacting a compound of (VI) with a compound of the General Formula III. The Compound VI can be prepared by reacting aspartic acid with phosgene.

For improved results, the reaction of (VI) and (III) is generally carried out under cooling at a temperature ranging from about $-20°$ C. to about $5°$ C. Any solvent can be employed if it will not adversely affect the reaction. Thus, tetrahydrofuran, dioxane, dimethylformamide, methylene chloride, chloroform, etc. may be mentioned by way of example. The reaction is usually completed within a period from about 1 hour to about 12 hours.

In any of the foregoing processes, the desired product can be recovered from the reaction mixture by, for example, phasic transfer, concentration, chromatography, crystallization, recrystallization and the like.

While the desired compound is usually obtained in its free form, it may be recovered as its physiologically acceptable salt, i.e. the corresponding addition salts with mineral acids such as hydrochloric acid, sulfuric acid, hydroiodic acid, hydrobromic acid, etc., the alkali metal salts with sodium, potassium, lithium etc., or the alkaline earth metal salts with calcium, magnesium and the like.

The conversion of the free dipeptide ester (I) into its physiologically acceptable salt is carried out by conventional means, for example, by bringing the free dipeptide ester (I) into contact with a mineral acid, an alkali metal hydroxide, an alkali metal carbonate or an alkaline earth metal hydroxide.

According to the above mentioned method, the new peptide esters, i.e. L-aspartyl-O-t-butyl-L-serine methyl ester, L-aspartyl-O-t-amyl-L-serine methyl ester as well as their physiologically acceptable salts are produced in good yields and high purities. These compounds have a degree of sweetness ranging from about 130 to about 200 times that of sucrose, generally occur as powders which are white, odorless and readily soluble in water; have a quality of sweetness which is refreshing and tasteful; are entirely free from an objectionable after-taste like that of saccharin sodium; and have a quality of sweetness which is comparable to that of sucrose.

In the following tests, the test compounds, L-aspartyl-O-t-butyl-L-serine methyl ester and L-aspartyl-O-t-amyl-L-serine methyl ester are simply abbreviated as Compound A and Compound B, respectively, and throughout the specification, milliliter(s), liter(s), gram(s) and kilogram(s) may be referred to as simply ml., l., g. and kg., respectively.

TEST 1

Each of Compound A and Compound B was dissolved and diluted with water and the sensory theresholds of the compounds were measured by the maximum dilution technique.

Discriminatable concentration with respect to distilled water:

|  | Percent |
|---|---|
| Compound A | 0.0018 |
| Compound B | 0.0012 |

Concentration at which the compound tastes sweet:

|  | Percent |
|---|---|
| Compound A | 0.0036 |
| Compound B | 0.0028 |

TEST 2

Aqueous solutions of Compound A and Compound B were prepared in concentrations of 0.025% and 0.05% by weight per volume, respectively. Using those solutions as reference samples and aqueous solutions of sucrose in five different concentrations as matching samples, a sensory test was conducted with a panel of 50 experts and the following equivalent concentrations were obtained by probit analyses.

TABLE 1

| Reference sample, percent | Equivalent concentration of sucrose with respect to reference sample, percent of— | | Time the degree of sweetness of sucrose, times of— | |
|---|---|---|---|---|
|  | Cpd. A | Cpd. B | Cpd. A | Cpd. B |
| 0.025 | 3.87 | 5.10 | 155 | 204 |
| 0.05 | 6.46 | 8.90 | 129 | 178 |

The dipeptide ester compounds are found to be non-toxic from the toxicity tests by the oral administration of the dipeptide ester compounds to mice, and the dipeptide ester compounds of the present invention can be used as such or added to foods in the same manner as the conventional sweetener saccharin sodium.

The most effective amount of the dipeptide ester to be employed varies with the kind of foods to be sweetened, but usually about 0.005% to about 1% by weight relative to the food served is employed. An amount over 1% is superfluous for the increase of sweetness and an amount below about 0.005% is not sufficient to sweeten foods.

In sweetening foods, the foods to be sweetened by the present invention are incorporated with at least one dipeptide ester compound, and foods having enhanced and good sweetness are produced.

Among the foods to which the present invention is applicable are various powdery, liquid and solid foods in which sweeteners are usually incorporated. For instance, various alcoholic beverages such as wines, refined sake, fermentted fruit drinks (including sweet fermented fruit drinks), beer, western-style alcoholic beverages, etc., nonalcoholic beverages including fruit juices and synthetic juices, fermented milk, instant beverages including instant juices, instant coffee, instant soybean drinks, etc., candied fruits, ice confections, syrups, foods soaked in fruit syrups, miso, soy, unrefined soy, sauces, vinegar, dressings, mayonnaise, ketchup, curry roux, soups, powdered seasonings, powdery soy, powdered soybean paste, rice balls, rice cakes and other rice confections, bread, western-style confections, raw rice confections, biscuits, crackers, chocolate, caramel, candies, chewing-gum, jellies, puddings, candied fruits and vegetables, fresh cream, jams, marmalade, flour paste, condensed milk powder, ice cream, sherbert, bottled vegetables, fruits and other products, canned foods, cooked farm products including cooked beans, cooked meats, gourmet foods, cooked delicacies, pickles of farm produces, smoked fish and animal meats, meat products such as hams and sausages, whale meat products, fish hams, fish sausages, fish pastes preserved seaurchins and other marine products, pickles and other preparations of fish roes, dried fishes, frozen foods, seaweed pickles, meat pickles, dry salted sea tangles, sea tangle rolls and other preserved and cooked seaweeds, marine delicacies, seaweed gourmet foods, seasoned seaweeds, and canned foods of marine or animal origin. Aside from those varied foods originating from farms and from aquatic, forestal and animal sources, such as other products as compound seasonings and condiments, compound sweeteners, such luxury articles as tobacco, drugs and pharmaceutical preparations including dentifrices and the like may be mentioned by way of example. Thus, insofar as the object of the invention can be applied to any kind of foodstuff.

As regards the mode of incorporation of the present dipeptide esters into foods, any of the procedures routinely employed in the production of foods, such as blending, admixing, dissolution, soaking, impregnation, dusting, spraying, injection, etc., can be utilized.

As regards the timing of addition to foods, the present compounds may be added in the course of production of such foods and, preferably, is added evenly near the end of processing. In other words, they may be added in the same manner as saccharin sodium. For example, in the case of cooked foods such as a curry roux, the compounds are preferably added uniformly at the end of heating or after heating.

The dipeptide ester compounds have a strong ability to sweeten food and it is often difficult to weigh the correct amount of the dipeptide ester compound necessary to efficiently sweeten foods. Therefore, it is necessary to provide sweetening compositions in which the dipeptide ester compound is appropriately diluted. Such a composition convenient for handy and practical use is prepared by incorporating at least one dipeptide ester compound with suitable solid carrier or liquid carrier which is known per se as adjuvants.

Such a solid carrier is exemplified by carboxymethylcellulose, glucose, lactose or dextrin, and the like. The liquid carrier is exemplified by water, aqueous alcohol or propylene glycol, and the like.

It is also possible to use the present dipeptide ester compounds in combination with other known additives for foods, e.g. sweeteners (such as sucrose, glucose, sorbitol, saccharin, glycine, alanine, glycyrrhizin, and the like) perfumes or food colors, and the like. Those additives are to be construed as "carrier" or "adjuvant" in the present invention.

For preparing the composition matter, any of conventional means are employed, and for example, the dipeptide ester compounds are formulated by simple and thorough admixture of the dipeptide compound with the carrier or carriers into solid compositions (e.g. powders, granules and the like), liquid compositions (e.g. solutions, syrup or the like), etc.

The amount of the dipeptide ester relative to the whole composition is usually about 0.1% to about 50% by weight.

This invention will be further illustrated by way of examples. In those examples, the term "part(s) by weight" has the same relationship to the term "part(s) by volume" as do "gram(s)" to "milliliter(s)", and the term "sodium 5′-nucleotide" is intended to mean "a mixture of sodium inosinate and sodium guanylate (1:1 by weight)."

EXAMPLE 1

(I) Preparation of carbobenzoxy-$\beta$-benzyl-L-aspartyl-O-t-butyl-L-serine methyl ester In 70 parts by volume of methanol is dissolved 3.72 parts by weight of carbobenzoxy-O-t-butyl-L-serine methyl ester, followed by the addition of 0.72 parts by volume of glacial acetic acid.

The catalytic reduction is carried out in the presence of a suitable amount of palladium black in hydrogen streams. The palladium black is filtered off and the methanol is removed by distillation under reduced pressure, whereupon an oil is obtained. This oil is dissolved in 20 parts by volume of dioxane and, under cooling with ice, 1.68 part by volume of triethylamine is added, followed by the addition of carbobenzoxy-$\beta$-benzyl-L-aspartic pentachlorophenyl ester. The reaction is allowed to continue overnight at room temperature. The dioxane is distilled off, and the oil is dissolved in ethyl acetate. The ethyl acetate layer is washed with 0.2 N-HCl and a 5% (weight per volume) aqueous solution of sodium bicarbonate, followed by drying over anhydrous sodium sulfate. The ethyl acetate is removed by distillation to obtain the desired compound as oil and the compound is dissolved in a small quantity of chloroform. It is then purified by chromatography on silica gel. The yield is 4.5 parts by weight (88.3%) (oil).

(II) Preparation of L-aspartyl-O-t-butyl-L-serine methyl ester

In 100 parts by volume of methanol is dissolved 4.5 parts by weight of the carbobenzoxy-$\beta$-benzyl-L-aspartyl-O-t-butyl-L-serine methyl ester obtained above (I), and 0.6 part by volume of glacial acetic acid is added.

The catalytic reduction is carried out using palladium black in hydrogen streams. The palladium black is filtered off and the methanol is removed by distillation, which leaves a gel. Ether is added to the residual gel to give the objective compound as powdery precipitate and the powdery precipitate is recovered by filtration. It is then reprecipitated from methanol-ether. Yield: 2.5 parts by weight (98.0%). M.P. 115.0°–121.0° C. (d); $[\alpha]_D^{23}$ +6.8° (c.=0.96 in methanol).

*Analysis.*—Calcd. for $C_{12}H_{22}O_6N_2 \cdot \frac{1}{2}H_2O$ (percent): C, 48.15; H, 7.74; N, 9.36. Found (percent): C, 47.84; H, 7.66; N, 9.32.

In the above method, the same molar amount of carbobenzoxy-O-t-amyl-L-serine methyl ester was employed in place of carbobenzoxy-O-t-butyl-L-serine methyl ester to obtain L-aspartyl-O-t-amyl-L-serine methyl ester, which is the same compound to be mentioned below in Example 4.

EXAMPLE 2

(1) Preparation of carbobenzoxy-β-benzyl-L-aspartyl-L-serine methyl ester

In 200 parts by volume of acetonitrile is suspended 5.6 parts by weight of L-serine methyl ester hydrochloride and, under cooling with ice, 5.04 parts by volume of triethylamine is added. Then, 9.27 parts by weight of carbobenzoxy-β-benzyl-L-aspartic acid is added, followed by the addition of 7.4 parts by weight of dicyclohexylcarbodiimide. The reaction is allowed to continue overnight at room temperature. The dicyclohexylurea is filtered off and the acetonitrile is removed by distillation, whereupon a white crystalline powder is obtained. The powder is dissolved in ethyl acetate and the ethyl acetate layer is washed with 0.5 N-NCl and a 5% (weight per volume) aqueous solution of sodium carbonate, followed by drying over anhydrous sodium sulfate.

The ethyl acetate is removed by distillation, whereupon white crystals of the desired compound separate. Ether is added, followed by filtration. The precipitate is recrystallized from ethyl acetate. Yield 8.3 parts by weight (60.0%); M.P. 125.0°–126.0° C.; $[\alpha]_D^{23°}$ −2.0° (c.=1.00 in methanol).

Analysis.—Calcd. (percent): C, 60.25; H, 5.72; N, 6.11. Found (percent): C, 60.39; H, 5.80; N, 5.96.

(2) Preparation of L-aspartyl-O-t-butyl-L-serine methyl ester

In 100 parts by volume of methylene chloride is dissolved 2.3 parts by weight of the carbobenzoxy-β-benzyl-L-aspartyl-L-serine methyl ester obtained above (I), and 0.1 part by volume of concentrated sulfuric acid is added. Then, an excess amount of isobutene gas is bubbled into the mixture and, under sealing, the reaction mixture is allowed to stand at room temperature for 2 days. A neutralizing amount of sodium bicarbonate is added to the reaction mixture and the isobutene is distilled off. Then, the methylene chloride is removed by distillation under reduced pressure. The residual oil is dissolved in ethyl acetate and washed with 0.2 N-HCl and a 5% (weight per volume) aqueous solution of sodium bicarbonate in the routine manner, followed by drying over anhydrous sodium sulfate. The ethyl acetate is removed by distillation, which leaves an oil. The oil is purified by chromatography on silica gel in the manner described in Example 1–(I). Yield 2.5 parts by weight (97.3%), (oil). This oil is catalytically reduced in the presence of palladium black in the same manner as Example 1, whereby the desired product is prepared. M.P. 113.0–120.0° C. (d); yield 1.3 part by weight (92.9%); $[\alpha]_D^{23}$ −6.8° (c.=0.98 in methanol).

EXAMPLE 3

Preparation of L-aspartly-O-t-butyl-L-serine methyl ester

In 70 parts by volume of methanol is dissolved 3.09 parts by weight of carbobenzoxy-O-t-butyl-L-serine methyl ester and the catalytic reduction is carried out in the presence of a suitable amount of palladium black in hydrogen streams. The palladium black is filtered off and the methanol is removed by distillation, which leaves an oil. This oil is dissolved in 50 parts by volume of methylene chloride and the solution is cooled to −65° C., followed by the addition of 1.40 parts by volume of triethylamine. On the other hand, 1.59 parts by weight of L-2,5-oxazolidinedione-4-acetic acid, which is obtainable in the conventional manner, is dissolved in 30 parts by volume of methylene chloride and, after cooling to −65° C. the solution is gradually added to the above solution. The reaction is allowed to continue at −65° for 3 hours and, then at room temperature overnight. The methylene chloride is distilled off and the residue is dissolved in a small quantity of water. The solution is passed through a column of Sephadex G–10 and the eluate corresponding to the captioned compound is collected. The water is removed by distillation and the residue is precipitated from methanol-ether. The procedure yields the same compound as the product according to Example 1–(2).

In the above method, the same molar amount of carbobenzoxy-O-t-amyl-L-serine methyl ester was employed in place of carbobenzoxy-O-t-amyl-L-serine methyl ester to obtain L-aspartyl-O-t-amyl-L-serine methyl ester, which is the same compound to be produced according to the following Example 4.

EXAMPLE 4

Preparation of L-aspartyl-O-t-amyl-L-serine methyl ester

In 30 parts by volume of methylene chloride is dissolved 4.3 parts by weight of carbobenzoxy-β-benzyl-L-aspartyl-L-serine methyl ester, and 0.1 part by volume of concentrated sulfuric acid is added.

Then, an exces samount of 2-methyl-1-butene is added into the mixture and, under sealing, the reaction mixture is allowed to stand at room temperature for 3 hours. A neutralizing amount of sodium bicarbonate is added to the reaction mixture and the 2-methyl-1-butene is distilled off. Then, the methylene chloride is removed by distillation under reduced pressure. The residual oil is dissolved in ethyl acetate and washed with 0.2 N-HCl and a 5% (weight per volume) aqueous solution of sodium bicarbonate in the routine manner, followed by drying over anhydrous sodium sulfate. The ethyl acetate is removed by distillation, which leaves an oil. The oil is purified by chromatography on silica gel in the manner described in Example 1–(I). Yield 4.1 parts by weight (82%) (oil). This oil is catalytically reduced in the presence of palladium black in the same manner as Example 1, whereby 2.0 parts by weight of the desired product melting at 72 to 74° C. is obtained as white gel. The yield is 85%. $[\alpha]_D^{27}$=+7.1° (c.=1.00% in methanol).

Analysis as $C_{13}H_{24}O_6N_2 \cdot \frac{1}{2}H_2O$.—Calcd. (percent): C, 49.82; H, 8.04; N, 8.94. Found (percent): C, 50.02; H, 8.25; N, 8.80.

EXAMPLE 5

To a mixture of 50 g. of fragmented sea bream meat, 50 g. sweet sake, 100 g. of 70% sorbitol solution and 300 g. brown soybean paste, 1 g. of L-aspartyl-O-t-butyl-L-serine methyl ester is evenly added, and the whole mixture is processed in the routine manner to obtain a "tai-miso." This product has a delicious taste.

EXAMPLE 6

To 4.33 kg. of a roux which has been routinely prepared from 35 parts by weight of beef tallow and 65 parts by weight of wheat flour, there are added 0.2 kg. of powdery vegetable protein hydrolysate, 0.17 kg. of onion powder, 1 kg. of sodium chloride, 2 g. of L-aspartyl-O-t-butyl-L-serine methyl ester, 0.33 kg. of sodium L-glutamate, 0.01 kg. of citric acid and 0.01 kg. of sodium 5′-ribonucleotide. The mixture is uniformly blended in the conventional manner to obtain a potage premix. This product gives a potage of a delicious taste.

EXAMPLE 7

Three kilograms of purified beef tallow is melted and 2.5 kg. of wheat flour, 0.5 kg. of corn starch and 0.5 kg. of dextrin are evenly added.

Under heating, the mixture is thoroughly blended, followed by the addition of 0.2 kg. of defatted milk powder, 1.2 kg. of sodium chloride, 0.1 kg. of sodium L-glutamate, 0.05 kg. of sodium 5'-ribonucleotide, 0.05 kg. of disodium succinate and 1 g. of L-aspartyl-O-t-amyl-L-serine methyl ester. The mixture is evenly blended and, then with the addition of 1.4 kg. of curry powder, it is treated in the routine manner to obtain a curry roux. This product gives a curry of delicious taste.

EXAMPLE 8

A mixture of 30 kg. of concentrated mandarin orange (variety: Unshu) juice, 10 kg. of sorbitol powder, 50 g. of citric acid, 20 g. of vitamin C, 100 g. of orange essence and 0.06 kg. of L-aspartyl-O-t-butyl-L-serine methyl ester is evenly dissolved in water to make 100 liters, and the solution is pasteurized at about 95° C. for about 20 seconds. The solution is then dispensed into 20 ml. bottles in the routine manner. The orange juice thus prepared has good quality of sweetness and does not undergo a change in quality on standing at room temperature for one month.

EXAMPLE 9

To 1 kg. of a lactose powder containing, by weight, 6% of concentrated (⅕) mandarin orange (variety: Unshu) juice, 5% of citric acid, 1.2% of powdery orange essence and 0.6% of vitamin C, there is added 5 g. of L-aspartyl-O-t-amyl-L-serine methyl ester. The mixture is evenly blended in the routine manner to obtain an orange juice powder.

This product gives an orange juice which has a good quality of sweetness and is stable in qualities.

EXAMPLE 10

To a homogeneous solution of 1 kg. sorbitol powder, 0.1 kg. citric acid, 3 ml. orange essence and 2 g. vitamin $B_2$, there is added 6 g. of L-aspartyl-O-t-amyl-L-serine methyl ester.

After the ester is evenly dissolved, the solution is cooled to −4° C. and carbon dioxide gas is bubbled into the solution to an internal pressure of 3 kg./cm.$^2$. The solution is then dispensed into brown pressure-resistant bottles of 230 ml. capacity. The resulting carbonated beverage has a delicious taste.

EXAMPLE 11

In brewing tea from a commercial instant tea pack, 180 ml. of boiling water is added to the pack, followed by the addition of 0.05 g. of L-aspartyl-O-t-amyl-L-serine methyl ester. After the ester is evenly dissolved, the tea is served. This tea has a refreshing sweetness and a delicious taste.

EXAMPLE 12

Mandarin oranges (variety: Unshu) which have been peeled, treated with an alkali and an acid, washed and pre-treated in the conventional manner are filled into cans at the rate of 250 g. per can, and 60 g. of a syrup containing an even mixture of 20 weight percent of sucrose and 0.15 weight percent of L-aspartyl-O-t-butyl-L-serine methyl ester is filled into the cans, which are then clinched, sterilized and cooled.

The canned mandarin orange thus obtained has a refreshing sweetness and a delicious taste.

EXAMPLE 13

Five kilograms of apples are processed in the conventional manner to obtain an apple pulp. Then, 1.5 kg. of this pulp is blended with 0.6 kg. of 75% sorbitol solution, 0.01 kg. of carboxymethyl cellulose sodium, 6 g. of L-aspartyl-O-t-butyl-L-serine methyl ester of 3 liters of water to prepare an apple jam. This product has an excellent sweetness and a good flavor.

EXAMPLE 14

Candies are prepared in the routine manner from 30 kg. of sucrose, 35 kg. of starch sugar, 30 kg. of sorbitol powder, 1 kg. of citric acid, 0.01 kg. of L-aspartyl-O-t-amyl-L-serine methyl ester and 0.1 kg. of apple essence. This product has a refreshing sweetness.

EXAMPLE 15

Chocolate is produced in the routine manner from 23 kg. of cacao paste, 17 kg. of cacao butter, 25 kg. of sucrose, 8 kg. of sorbitol, 18 kg. of whole milk powder, 0.5 kg. of sucrose stearic acid ester, 1.0 kg. of milk essence, 0.5 kg. of strawberry essence and 0.1 kg. of L-aspartyl-O-t-butyl-L-serine methyl ester. This product has a delicious taste, and its sweetness is in harmony with its flavor.

EXAMPLE 16

Sponge cakes are produced in the routine manner from 1 kg. of eggs, 500 g. of sucrose, 100 g. of sorbitol powder, 100 g. of starch sugar powder, 1 g. of sucrose palmitic acid ester 0.8 g. of L-aspartyl-O-t-amyl-L-serine methyl ester and 500 g. of wheat flour. This product has a satisfactory sweetness and a delicious taste.

EXAMPLE 17

An ice cream is produced in the routine manner from 200 g. of fresh cream, 95 g. of defatted milk powder, 50 g. of sorbitol powder, 50 g. of starch sugar, 2 g. of sorbitan stearic acid ester, 3 g. of sodium alginate, 0.8 g. of L-aspartyl-O-t-btuyl-L-serine methyl ester, 500 ml. of water and 0.5 g. of vanilla essence. This product is excellent in both sweetness and flavor.

EXAMPLE 18

One kilogram of dry sea tangle is soaked in a liquid diment composed of 2 liters soy and 2 liters water and boiled for 2 hours in the conventional manner to obtain a seasoned sea tangle. In the above process, 300 g. of starch sugar and 0.6 g. of L-aspartyl-O-t-amyl-L-serine methyl ester are evenly added.

Then, a powdery composite condiment composed of 90 weight percent of sodium L-glutamate and 10 weight percent of sodium 5'-ribonucleotide are dusted over the above seasoned sea tangle, whereupon a salt-frosted sea tangle is obtained. This product has a delicious taste.

EXAMPLE 19

A soy-boiled laver is prepared in the routine manner from 2 kg. of green laver, 15 liters of soy, 5 kg. of sorbitol and 20 g. of L-aspartyl-O-t-butyl-L-serine methyl ester. This product has a delicious taste.

EXAMPLE 20

Four kilograms of the barrel portion of cuttle fish which has been skinned, boiled and air-dried is rolled evenly in a mixture of 200 g. of sodium chloride, 500 g. of sucrose, 500 g. of sorbitol powder and 40 g. of sodium L-glutamate and, then, held overnight under a slight pressure. Then, the cuttle fish is smoked and sliced into thin loops. The loops are evenly sprayed with a liquid condiment prepared by evenly dissolving 100 g. of sodium chloride, 4 g. of sodium L-glutamate and 3 g. of L-aspartyl-O-t-butyl-L-serine methyl ester in 500 ml. of water. The resulting smoked cuttle fish has a delicious taste.

EXAMPLE 21

A sausage is prepared in the routine manner from, by weight, 33.0% of mutton, 7.4% of horseflesh, 8.0% of pork, 5.0% Makaira mazara, 15.0% of lard, 5.0% of potato starch, 2.3% of sodium chloride, 0.2% sodium L-glutamate, 0.005% of L-aspartyl-O-t-amyl-L-serine methyl ester, 0.12% of smoke powder, 0.30% of sodium triphosphate, 0.01% of sodium nitrite, 0.03% of sodium erythorbate and 20.0% of ice. This product has a delicious taste.

EXAMPLE 22

Kamaboko (fish paste) is produced in the routine manner from, by weight, 40% of white croaker, 32.5% of frozen milled *Theragra chalcogramma* (Pallas), 3.0% of sodium chloride, 0.03% of L-aspartyl-O-t-butyl-L-serine methyl ester, 5.0% potato starch, 10.0% of water, 1.0% of sweet sake, 0.5% of sodium L-glutamate and 0.15% of sorbic acid sodium salt. This product has a delicious taste.

EXAMPLE 23

Twenty-grams of cured cucumbers are desalted and pressed in the conventional manner and, then, immersed in 20 liters of a liquid condiment which has been prepared by adding water to a mixture of 8.8 liters of soy, 100 g. of sodium glutamate, 20 g. of disodium succinate, 90 ml. of glacial acetic acid, 36 g. of sodium triphosphate, 5 g. of L-aspartyl-O-t-butyl-L-serine methyl ester and 3 g. of saccharin sodium. The resulting soy-soaked cucumber has a refreshing, delicious taste.

EXAMPLE 24

A dentifrice is prepared in the routine manner from, by weight, 50 kg. of dicalcium phosphate, 28 kg. of glycerine, 1.5 kg. of stearic acid monoglyceride, 1.5 kg. of sodium lauryl phosphate, 1 kg. of carboxymethylcellulose, 0.1 kg. of L-aspartyl-O-t-butyl-L-serine methyl ester and 17.5 kg. of water. This product has a refreshing sweetness and a breezy taste.

EXAMPLE 25

One-hundred ml. of a vitamin A/D syrup is prepared in the routine manner from 300,000 I.U. of vitamin A (palmitate), 30,000 I.U. of vitamin D, 1.5 g. of polysorbate 80, 0.1 g. of orange oil, 25 g. of sucrose, 15 g. of sorbitol and 0.3 g. of L-aspartyl-O-t-butyl-L-serine methyl ester.

This preparation has a refreshing taste suited for oral administration.

EXAMPLE 26

A sherbet is prepared by mixing in the routine manner 100 g. of sorbitol, 2.5 g. of L-aspartyl-O-t-amyl-L-serine methyl ester, 2.7 liters of water, 630 ml. of orange juice, 30 g. of gelatin, 150 g. of powdered milk, and 1 g. of orange essence and 0.1 g. of lemon essence. Thus produced sherbet has refreshing sweetness.

EXAMPLE 27

2.2 kg. of chicle base, 0.2 kg. of calcium carbonate, 5 kg. of dextrin, 2.5 kg. of sorbitol, 0.07 kg. of peppermint and 0.03 kg. of L-aspartyl-O-t-amyl-L-serine methyl ester are mixed together and formulated into chewing-gum, which has delicious sweetness.

EXAMPLE 28

A sweetening composition (powder) is prepared by evenly blending in the conventional manner, 75 kg. of glucose, 20 kg. of D-sorbitol and 5 kg. of L-aspartyl-O-t-butyl-L-serine methyl ester. This product is ten times as sweet as sucrose and its quality of sweetness is excellent.

EXAMPLE 29

A sweetening composition (solution) is prepared by even blending in the conventional manner, 1.2 kg. of saccharine sodium, 1.2 kg. of L-aspartyl-O-t-amyl-L-serine methyl ester and 1000 kg. of water.

What is claimed is:

1. A compound selected from the group consisting of a dipeptide ester of the general formula:

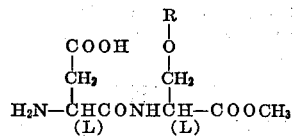

wherein R is tertiary butyl or tertiary amyl and its physiologically acceptable salt.

2. A compound according to claim 1, wherein R is tertiary butyl.

3. A compound according to claim 1, wherein R is tertiary amyl.

4. A compound according to laim 1, wherein the physiologically acceptable salt is sodium salt.

5. A compound according to claim 1, wherein the physiologically acceptable salt is hydrochloride.

6. A method for producing a compound selected from the group consisting of a dipeptide ester of the general formula:

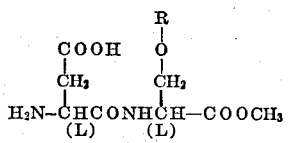

wherein R is tertiary butyl or tertiary amyl and its physiologically acceptable salt, which comprises etherizing a dipeptide ester derivative of general formula:

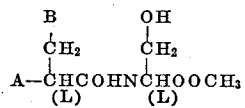

wherein A is a protected amino group and B is a protected carboxyl group to obtain a dipeptide ester derivative of general formula:

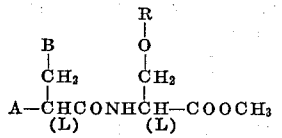

wherein A, B and R have the same meaning as defined above and subsequently removing the protective groups from the last-mentioned derivative.

References Cited

UNITED STATES PATENTS

| | | | |
|---|---|---|---|
| 3,695,898 | 10/1972 | Hill et al. | 260—112.5 |
| 3,475,403 | 10/1969 | Mazur et al. | 260—112.5 |
| 3,492,131 | 1/1970 | Schlatter | 260—112.5 |

OTHER REFERENCES

Mazur et al.: J. Am. Chem. Soc., 91, 2684 (1969).
Merrifield: Av. in Enzymology, 32, 252–256 (1969).
Bodanszky, M. and Ordetti, M. A.: "Peptide Synthesis," Interscience, New York, 1966, pp. 94–95.

LEWIS GOTTS, Primary Examiner

R. J. SUYAT, Assistant Examiner

U.S. Cl. X.R.

99—141 A